2,775,586
Patented Dec. 25, 1956

2,775,586

PREPARATION OF STARCH SULFATE ESTERS

Eugene F. Paschall, Orland Park, Ill., assignor to Corn Products Refining Company, New York, N. Y., a corporation of New Jersey No Drawing. Application October 4, 1954,
Serial No. 460,251

6 Claims. (Cl. 260—233.5)

This invention relates to the preparation of starch sulfate esters in ungelatinized condition which not only retain certain desirable colloidal properties of untreated starch but acquire other desirable properties in addition thereto. More particularly this invention relates to the preparation of starch sulfate esters containing a low percentage of sulfur, i. e., about one percent or less.

Polysaccharide sulfate esters have been prepared in the past by the use of strongly hydrolytic sulfating agents, such as sulfuric acid, chlorosulfonic acid, sulfuryl chloride, sulfur trioxide, and sulfamic acid. It has been proposed to reduce the extreme hydrolytic or degradative effect of such sulfating agents by the use of several of such miscible diluents; organic bases, such as pyridine and urea; aliphatic alcohols; immiscible diluents, such as toluene and ethylene dichloride; carbon disulfide; esters; acetic anhydride; acetic acid. Even under these conditions degraded and sometimes charred products resulted. In the case of starch sulfate esters the products were severly degraded (the molecular weight of the starch was decreased extensively) and the useful colloidal properties of undegraded starch were lost. The prior art methods were expensive due to the cost of the diluents or organic bases, and complicated since the product must be precipitated from the reaction medium and purified and the diluent or base recovered.

The main object of this invention is to provide a new type of starch sulfate ester, i. e., in ungelatinized, granule form, and a process for the preparation thereof. A further object is to provide a new sulfating agent for starch. Still a further object is to provide a simple process for making starch sulfate esters which permits easy washing and handling of these esters. Yet another object is to provide a starch sulfate ester which retains the colloidal properties of untreated starch. Still a further object is to provide a process for preparing starch sulfate ester in granule form and concurrently rendering such ester thin boiling. Other objects will appear hereinafter.

I have discovered that starch sulfate esters in ungelatinized, granule form may be prepared by reacting sodium nitrite with sodium bisulfite and then reacting the resultant compound with starch.

In carrying out the process of my invention, a semi-dry mixture of starch and the reaction product of sodium nitrite and sodium bisulfite is heated under conditions controlled so as to prevent gelatinization of the starch and of the resultant product until the desired starch sulfate ester has formed. The resultant starch sulfate ester will be thick boiling or thin boiling depending upon conditions, described hereinafter, under which it was prepared.

The reaction product of sodium nitrite and sodium bisulfite (sometimes referred to hereinafter as reagent) is readily prepared by either of two processes: (1) A hot aqueous solution of sodium nitrite is added slowly to an aqueous solution of sodium bisulfite and the solution allowed to cool. (2) Sulfur dioxide is passed into an aqueous solution of sodium nitrite containing sodium carbonate until the pH of the solution ranges from slightly acidic (about 5) to only slightly alkaline (about 8). If sulfur dioxide is passed into the sodium nitrite-sodium carbonate solution until the pH is below about 5, rapid decomposition of the reagent takes place whereas if insufficient sulfur dioxide is added, the reagent preparation will not be complete, resulting in lower degree of substitution of the resultant starch sulfate ester. Starch, either in aqueous slurry or dry form, is mixed with the aqueous solution of the reagent. Starch may also be mixed with sodium nitrite and sodium bisulfite in which case it is preferable to slurry the starch in water and add the sodium nitrite and sodium bisulfite although aqueous solutions of the salts may be added to dry or semi-dry starch. The moisture content of the mixture is adjusted, if necessary, and then the mixture is roasted in conventional roasting equipment until the desired product is obtained.

The chemistry of the reactions involved during the preparation of the reagent and formation of starch sulfate esters is not known with certainty but is believed to be as follows:

$$NaNO_2 + 4\ NaHSO_3 \rightarrow N(SO_3Na)_3 + 2\ H_2O + Na_2SO_3$$
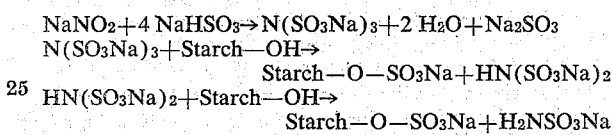

The molar ratio of $NaNO_2$ to $NaHSO_3$ may vary considerably without any appreciable change in the reaction efficiency, but the practical operating and preferred molar ratio is from $1(NaNO_2)$ to about $3(NaHSO_3)$ to $1(NaNO_2)$ to about $5(NaHSO_3)$. The viscosity of products obtained when using the lower ratio of the range is reduced, resulting in desirable thin boiling sulfate esters. Thick boiling starch sulfate esters result when the molar ratio of $NaHO_2$ to $NaHSO_3$ is 1 to about 5.

If the reagent is added to a slurry of starch, the moisture content of the mixture should preferably be decreased to about 5 to about 10 percent, as by filtration or other means of dewatering mechanically, followed by air drying of the mixture, before the roasting treatment is begun. The filter cake, for example, may be dried in a section type drier wherein the temperature is increased gradually as the moisture content decreases so that gelatinization of the starch is prevented.

The temperature of the roasting treatment may be as high as about 120° C. provided the moisture content of the mixture is below about 5 percent. However, the preferred range of temperatures for the treatment is about 90° C. to about 105° C. for a moisture content of about 5 to about 10 percent. The time of the treatment depends upon the moisture content of the mixture and the temperature, the lower the moisture content and the higher the temperature, the shorter is the time required. Generally, a time period of 1 to 3 hours is satisfactory for a moisture range of 5 to 10 percent and a temperature range of 90° to 105° C. At temperatures below 90° C., longer times are required, for example, at 65° C., the time may be 16 hours.

Salts, such as sodium sulfate, sodium chloride, which retard gelatinization of starch and starch derivatives, may be added to the mixture which is to be treated.

The initial pH of the mixture undergoing heat treatment should be 5 or above, the preferred range being 6 to 11. pH values above 11 may be employed; however, if the initial pH is above about 11, hydrolysis of the resultant starch sulfate ester occurs, thus decreasing the degree of substitution. At an initial pH below 5 there is rapid decomposition of the sulfating agent (as previously noted) which results in extremely acidic conditions and concurrent degradation of the starch. The pH of the mixture undergoing the heat treatment generally decreases during such treatment except in highly buffered systems. Generally, a satisfactory buffering effect is obtained by the use of a high ratio of $NaHSO_3$ to $NaNO_2$ or by using an excess of $Na_2CO_3$ in method (2) of the preparation of the reagent. If it is desired to buffer the system by other means, the use of buffers, such as sodium phosphate-citric acid, sodium bicarbonate-sodium carbonate, and the like, is satisfactory.

Under certain conditions, as in Example IV, the product will produce a cloudy paste. To produce a clear paste in such instance an alkaline pH is needed and any alkaline substance commonly used for this purpose may be used, e. g., sodium carbonate, ammonia, sodium hydroxide, or other basic compounds, such as quaternary ammonium bases and amines. The use of sodium carbonate is advantageous when method (2) is used in the preparation of the reagent.

My invention is applicable to all raw starches, e. g., corn (maize), wheat, sorghum grain, waxy maize, rice, tapioca, etc., and also to various modified starches, e. g., thin boiling starches, oxidized starches, and the like, which retain their granule form. If thin boiling esters are desired, it is preferably to make them by sulfating raw starch in accordance with the detailed procedure described in Examples VII and VIII. The term "starch," as used herein and in the appended claims, is intended to include all of the aforementioned substances.

Starch sulfate esters, which form clear pastes and do not set back on standing, may be prepared by the practice of my invention. Furthermore, there may be prepared starch sulfate esters which form pastes with greatly increased water holding capacity, i. e., increased viscosity, over untreated starch. For example, the viscosity of a thick boiling starch sulfate ester prepared according to my invention was 243 seconds (15 g. Scott per 50 ml. of paste) whereas the viscosity of the original starch from which the ester was prepared was 80 seconds (same basis). Pastes of my new starch sulfate esters are stable for several weeks (in the absence of bacteria) whereas untreated starch pastes set back immediately upon cooling. The thick boiling esters of my invention are useful as thickening and suspending agents whereas the thin boiling esters may be prepared directly in a form suitable for use in sizing textiles and in coating paper where a high solids content of the ester is desired.

The following examples set forth below, which are intended as typical and informative only and not in a limiting sense, will further illustrate the invention.

EXAMPLE I

Thick boiling starch sulfate ester 13.8 grams (0.2 mole) of $NaNO_2$ in 50 ml. of boiling water was added over a period of 5 minutes to 80 g. (0.77 mole) of $NaHSO_3$ dispersed in 100 ml. of water. After cooling for 30 minutes, the pH of the solution was adjusted to 10 by addition of 3.6 g. (0.09 mole) of NaOH. 180 grams of corn (maize) starch was slurried into the solution. This slurry was filtered and the filter cake air dried in an oven for 3.5 hours at 65° C. The moisture content was about 6.5 percent. After pulverizing in a Waring Blendor, the starch mixture was roasted in a vacuum oven for 3 hours at 100° C. The pH of the product in a water slurry was adjusted to 7 with HCl and air dried. The derivative contained 0.42 percent sulfur, dry basis, and possessed an 8 g. D. B. Scott of 70 seconds for 50 ml. of paste. The paste prepared from the derivative was clear and did not set back on standing for 4 weeks (toluene was added to prevent bacterial decomposition).

EXAMPLE II

Thick boiling starch sulfate ester 6.9 grams (0.1 mole) of $NaNO_2$ dispersed in 50 ml. of hot water was added slowly to 52 g. (0.5 mole) of $NaHSO_3$ dissolved in 130 ml. of warm water. After cooling 30 minutes, 180 g. of corn (maize) starch was slurried into the solution and enough NaOH added to raise the pH to 9.8. The slurry was filtered and the filter cake dried to about 10 percent moisture content in an air oven at 70° (2 hours). This mixture was powdered and heated in a vacuum oven for 1 hour at 120°. The product (pH 8.0), after washing, formed a long, viscous, clear paste which did not set back when cooked in water. The sulfur content of the product was 0.28 percent, dry basis. The product possessed a 13 g. Scott value of 114 seconds for 50 ml. of paste.

EXAMPLE III

Thick boiling starch sulfate ester

A solution containing 12.5 g. (0.18 mole) of sodium nitrite in 100 ml. of water was brought to boiling and was added to 300 ml. of a solution containing 94 g. (0.9 mole) of sodium bisulfite. The mixture was warmed to 60° C. and vigorous boiling occurred. The entire solution after cooling was then slurried with 180 g. of corn (maize) starch and sufficient ammonium hydroxide was added to raise the pH of the slurry to 9. The slurry was filtered and the filter cake was dried in an air oven for 2 hours at 70° C. to a moisture content of about 9 percent. Then part of the product was transferred to a vacuum oven and heated for 1 hour at 110° C. The resultant product, after being washed, had a sulfur content of 0.28 percent, dry basis, and when heated in water formed a heavy, clear, viscous paste. Another part of said product was heated 18 hours in the vacuum oven, and, after washing, the sulfur content thereof was 0.293 percent, dry basis.

EXAMPLE IV

Thick boiling starch sulfate ester 13.8 grams (0.2 mole) of $NaNO_2$ in 50 ml. of boiling water was added over a period of 5 minutes to 52 g. (0.5 mole) of $NaHSO_3$ dispersed in 150 ml. of water. The pH of the resultant reagent was 6.2. 180 grams of starch was slurried into the solution. The slurry was filtered and the filter cake was air dried in an air oven for 17 hours at 50° C. Then the product was transferred to a vacuum oven and heated at 105° C. for 2½ hours. The sulfur content of the ester was 0.31 percent, dry basis. The paste prepared from the ester was short, cloudy, and highly viscous; the Scott value of the paste was 133 seconds for 50 ml. of paste on the basis of 15 g. of ester in 280 ml. of water.

EXAMPLE V

Thick boiling starch sulfate ester

The above example was repeated but the pH of the slurry was adjusted to 10 with NaOH prior to filtration. The paste prepared from the final product was long, clear, and viscous.

EXAMPLE VI

Thick boiling starch sulfate ester 4.8 grams (0.7 mole) of $NaNO_2$ in 50 ml. of hot water was added to 35 g. (0.3 mole) of $NaHSO_3$ in 150 ml. of water. The solution was allowed to cool for 30 minutes after which 180 g. of starch was added thereto. The pH of the slurry was adjusted to 9.3 with NaOH solution. The slurry was filtered and the filter cake dried in an air oven for 16 hours at 65° C. Part of the product was slurried in water, the pH of the slurry adjusted to 8 with HCl. The product was filtered and washed with water. This product had a sulfur content of 0.15, dry basis. A paste made from this ester was slightly opaque and quite viscous. After roasting a portion of the unwashed product at 110 C. for 1 hour, the sulfur content of the product, after washing, was increased to 0.22 percent, dry basis.

EXAMPLE VII

Thin boiling starch sulfate ester

A solution containing 13.8 g. (0.2 mole) of $NaNO_2$, 35 g. (0.3 mole) $Na_2CO_3$ in 150 ml. of water was treated with $SO_2$ gas until a pH of 7.6 was reached. The pH was reduced to 7.0 with 13 g. (0.036 mole) of HCl. The solution was buffered with sodium phosphate-citric acid at pH 7. 180 grams of corn (maize) starch was stirred into the solution and the slurry filtered and the cake air dried in an oven at 60° C. for 3 hours. The moisture content was about 8 percent. The mixture was roasted in a vacuum oven for 1.5 hours at 100° C. The product in aqueous slurry was neutralized, filtered, washed, and air-dried. The derivative contained 0.47 percent sulfur, dry basis, and possessed a 13 g. Scott of 17 seconds for 50 ml. of paste. Paste of the product was clear and did not set back on standing for 4 weeks. Toluene was added to prevent bacterial decomposition.

EXAMPLE VIII

Thin boiling starch sulfate ester 13.8 grams (0.2 mole) of $NaNO_2$ in 50 ml. of boiling water was added over a period of 5 minutes to 62.4 g. (0.6 mole) of $NaHSO_3$ dispersed in 50 ml. of water. After the solution had cooled for 30 minutes, 180 g. of starch was slurried in it. The slurry was filtered and the filter cake dried in an air oven for 17 hours at 50° C. Then the product was transferred to a vacuum oven and heated at 110° C. for 1½ hours. The pH of the final product was 7.2. The starch sulfate ester was slurried in water, filtered and air dried. The sulfur content of this ester was 0.42 percent, dry basis. The paste prepared from the ester was clear and did not set back on standing. The Scott viscosity of the paste was 13.5 seconds on the basis of 13 g. of ester for 50 ml. of paste.

EXAMPLE IX

Thick boiling starch sulfate ester 90 grams of $NaHSO_3$ was added to 200 ml. of water containing 180 g. of starch. The slurry was warmed to 35° C. Then 13.8 g. of $NaNO_2$ in 40 ml. of boiling water was added, with vigorous stirring, to the slurry over a period of 5 minutes. The slurry was stirred for one hour and filtered. The filter cake was dried in an air oven for 17 hours at 50° C. The moisture content of the dried product was about 5 percent. The product was roasted in a vacuum oven for 2½ hours at 105° C. and then washed with water and dried. The sulfur content of the ester was 0.31 percent, dry basis. When heated with water, the product formed a heavy, viscous, cloudy paste which had a 13 g. Scott value of 133 seconds for 50 ml. of paste.

I claim:

1. A process for preparing starch sulfate esters in ungelatinized, granule form which comprises heating starch in granule form in semi-dry condition in contact with the reaction product of sodium nitrite and sodium bisulfite under non-gelatinizing conditions until the desired starch sulfate ester is formed, the initial pH of the mixture undergoing treatment being at least about 5.

2. A process for preparing starch sulfate esters in ungelatinized, granule form which comprises heating starch in granule form in semi-dry condition in contact with the reaction product of sodium nitrite and sodium bisulfite under non-gelatinizing conditions until the desired starch sulfate ester is formed, the initial pH of the mixture undergoing treatment being at least about 5, the temperature not exceeding about 120° C.

3. A process for preparing starch sulfate esters in ungelatinized, granule form which comprises adding the reaction product of sodium nitrite and sodium bisulfite to an aqueous slurry of unswollen, granule starch, filtering the resultant slurry and progressively dehydrating while progressively increasing the temperature of the filter cake to a temperature not exceeding about 120° C., under non-gelatinizing conditions, until the desired starch sulfate ester is formed, the pH of said resultant slurry being at least about 5.

4. Process according to claim 3 wherein the reaction product of sodium nitrite and sodium bisulfite is formed by passing sulfur dioxide into a solution of sodium nitrite containing sodium carbonate until the pH of solution ranges from about 5 to about 8.

5. A process for preparing starch sulfate esters in ungelatinized, granule form which comprises forming an aqueous slurry of starch containing sodium nitrite and sodium bisulfite, allowing these salts to react, filtering the resultant slurry and progressively dehydrating while progressively increasing the temperature of the filter cake to a temperature not exceeding about 120° C., under non-gelatinizing conditions, until the desired starch sulfate ester is formed, the pH of said resultant slurry being at least about 5.

6. A process for preparing a thin boiling starch sulfate ester in granule form which comprises reacting in water one mole of sodium nitrite with not more than about 3 moles of sodium sulfite, the pH of the solution being at least about 5, adding said solution to starch in granule form, heating the resultant mixture in semi-dry condition under non-gelatinizing conditions until the desired starch sulfate ester is formed, the temperature of the heat treatment not exceeding about 120° C.

References Cited in the file of this patent

UNITED STATES PATENTS

| | | |
|---|---|---|
| 2,686,779 | Jones | Aug. 17, 1954 |
| 2,697,093 | Jones | Dec. 14, 1954 |